United States Patent
Arana Hidalgo

(10) Patent No.: US 10,890,971 B2
(45) Date of Patent: Jan. 12, 2021

(54) REAL TIME VIRTUAL REALITY (VR) SYSTEM AND RELATED METHODS

(71) Applicant: Airbus Operations, S.L., Getafe (ES)

(72) Inventor: Alberto Arana Hidalgo, Getafe (ES)

(73) Assignee: AIRBUS OPERATIONS S.L., Getafe (ES)

(*) Notice: Subject to any disclaimer, the term of this patent is extended or adjusted under 35 U.S.C. 154(b) by 0 days.

(21) Appl. No.: 16/549,240

(22) Filed: Aug. 23, 2019

(65) Prior Publication Data

US 2020/0064919 A1 Feb. 27, 2020

(30) Foreign Application Priority Data

Aug. 27, 2018 (EP) .................................... 18382625

(51) Int. Cl.
*G06F 3/01* (2006.01)
*B64F 5/40* (2017.01)
*B64F 5/10* (2017.01)
*G06F 3/14* (2006.01)

(52) U.S. Cl.
CPC .............. *G06F 3/014* (2013.01); *B64F 5/10* (2017.01); *B64F 5/40* (2017.01); *G06F 3/14* (2013.01)

(58) Field of Classification Search
CPC .... B64F 5/10; B64F 5/40; G06F 3/011; G06F 3/014; G06F 3/04815; G06F 3/14; G06F 3/0304; A63F 13/5255; G09B 23/28; H04N 5/23238
See application file for complete search history.

(56) References Cited

U.S. PATENT DOCUMENTS

| | | | |
|---|---|---|---|
| 2012/0117514 A1 | 5/2012 | Kim et al. | |
| 2012/0122062 A1* | 5/2012 | Yang | G09B 23/28 434/219 |
| 2013/0162632 A1 | 6/2013 | Varga et al. | |
| 2016/0187974 A1* | 6/2016 | Mallinson | A63F 13/5255 463/32 |
| 2016/0246370 A1 | 8/2016 | Osman | |

(Continued)

FOREIGN PATENT DOCUMENTS

WO 2017190205 A1 11/2017

OTHER PUBLICATIONS

European Search Report; priority document.
(Continued)

*Primary Examiner* — Richard J Hong
(74) *Attorney, Agent, or Firm* — Greer, Burns & Crain, Ltd.

(57) ABSTRACT

A virtual reality (VR) system for providing a real time VR visualization of a target area of an aircraft that comprises one or more reference targets established in known locations in the target area of an aircraft, hand gloves, a plurality of sensing elements established on at least the operator's hand gloves, a reception device that receives the information provided by the sensing elements to provide relative locations of the sensing elements against the one or more reference targets. The reception device comprises processing means to build the real time VR visualization that represents at least the operator's hands against the target area of the aircraft based on the sensing elements. The VR system also comprises display means that display the real time VR visualization to the operator.

8 Claims, 2 Drawing Sheets

(56) References Cited

U.S. PATENT DOCUMENTS

2017/0322119 A1 9/2017 Da Silva et al.
2018/0131907 A1* 5/2018 Schmirler .......... H04N 5/23238
2019/0129607 A1* 5/2019 Saurabh ................ G06F 3/0304

OTHER PUBLICATIONS

Mark A. Livingston et al., "Pursuit of "X-Ray Vision" for Augmented Reality Environments," Jan. 1, 2013, pp. 67-107.
Henry Fuchs et al., "Augmented Reality Visualization for Laparoscopic Surgery" In: "Medical Image Computing and Computer-Assisted Interventation," Jan. 1, 1998, pp. 934-943.
Benjamin Avery, "X-Ray Vision for Mobile Outdoor Augmented Reality," University of South Australia, Adelaide, South Australia.

* cited by examiner

REAL TIME VIRTUAL REALITY (VR) SYSTEM AND RELATED METHODS

CROSS-REFERENCES TO RELATED APPLICATIONS

This application claims the benefit of the European patent application No. 18382625.4 filed on Aug. 27, 2018, the entire disclosures of which are incorporated herein by way of reference.

FIELD OF THE INVENTION

The present invention refers to a real time VR system for providing a VR visualization of a working area of an aircraft and methods to obtain the VR visualization.

BACKGROUND OF THE INVENTION

Currently when an assembly fitter operator needs to install something in a target area with difficult access for the operator, normal practice is to provide holes in the structure with the size not only for introducing the element to be installed or the tool required for the installation but with a larger size or additional holes for the operator to have a direct sight of the area of installation to properly locate and install the component. In some cases, this direct sight criteria affects the areas where certain elements can be installed but in all the cases, the sizes of holes causes an increase of weight for the structure, i.e., reinforcements around the holes or simply due to the change in load path. Furthermore, obtaining a direct sight view sometimes can cause short and long term injuries due to a poor posture of the operator.

Therefore, a system that permits the (assembly fitter) operator to install elements in target areas having a difficult access for the operator without performing holes in the structure of the aircraft that would cause an increase of weight in the structure and possible injuries is desired.

SUMMARY OF THE INVENTION

The proposed system is a virtual reality VR system that solves the aforementioned drawbacks and provides other advantages that are described below.

During an installation procedure performed by an operator, the proposed virtual reality system can capture the position and attitude of the hands of the operator and any other means as, e.g., tools, machines, fixtures, etc., in relation with fixed points or reference points located in known positions of a working area of the aircraft having a difficult access and wherein the operator must complete the installation. Hence, a VR visualization obtained by the proposed VR system can be displayed to the operator. The VR visualization can represent the operator's hands and tools within the target area having difficult access without the need for a direct sight view of the location that would require larger holes or accessory holes in the structure of the aircraft.

Hence, in one aspect of the present invention, it is proposed a virtual reality, VR system for providing a real time VR visualization of a target area of an aircraft which may have a difficult access. The target area can be an operator's working area for assembly or element installation within the aircraft.

The system comprises one or more reference targets established in known locations in the target area of an aircraft. In some examples, the one or more reference targets comprise target points located by means of holes. In some examples, the holes can be made by numeric control (NC). Furthermore, the system comprises hand gloves configured to fit the operator's hands.

A plurality of sensing elements established on at least on the operator's hand gloves, wherein the sensing elements provide information about the operator's hands location. In some examples, the plurality of sensing elements are also established in operator's tools hand tools or power tools and fixtures instrumented, e.g., electrical tools, pneumatic tools and liquid-fuel tools, and hydraulic tools.

A reception device adapted to receive the information provided by the sensing elements to provide relative locations of the sensing elements against the one or more reference targets established in the known locations and produces the VR information for direct visualization. In some examples, the visualization device are VR glasses. Combination of the reception and visualization devices can happen. In this respect, the information about the operator's hands comprise information of the location and attitude of each finger and an overall location and orientation of each operator's hand.

The reception device comprises processing means adapted to build the real time VR visualization that represents at least the operator's hands against the area of the aircraft based on the relative locations of the sensing elements and display means adapted to display the real time VR visualization to the operator. In some examples, the processing means are further adapted to visualize operator's tools and fixtures instrumented in the VR visualization. In some examples, the display means comprises a stereo display monitor.

In another aspect, a method is proposed for providing a virtual reality, VR visualization in real time, the method comprises establishing one or more reference targets in known locations of a target area of an aircraft with difficult access. The area can be a working area for assembly, installation, maintenance, etc.

Furthermore, the method comprises establishing a plurality of sensing elements on at least on the operator's hand gloves. In other examples, the sensing elements can be installed in tools, operator's fixtures, machines, etc. The sensing element provide information about the operator's hands location or any other element location. Furthermore, the method comprises receiving at a reception device the information provided by the sensing elements to provide relative locations (as e.g., spatial coordinates) of the sensing elements against the one or more reference targets established in the known locations of the working area. The method also comprises the step of building the VR visualization that represents at least the operator's hands against the known locations of the aircraft based on the relative locations of the sensing elements and the step of displaying the VR visualization to the operator.

Hence, the invention also proposes a method to provide the operator visualization information about the exact position and orientation of the element to be installed, the operator's hands and any other installation means like tools or fixtures in the area with difficult access within the aircraft.

BRIEF DESCRIPTION OF THE DRAWINGS

For a better understanding the above explanation and for the sole purpose of providing an example, some non-limiting drawings are included that schematically depict a practical embodiment.

DETAILED DESCRIPTION OF A PREFERRED EMBODIMENTS

Figure 1A:
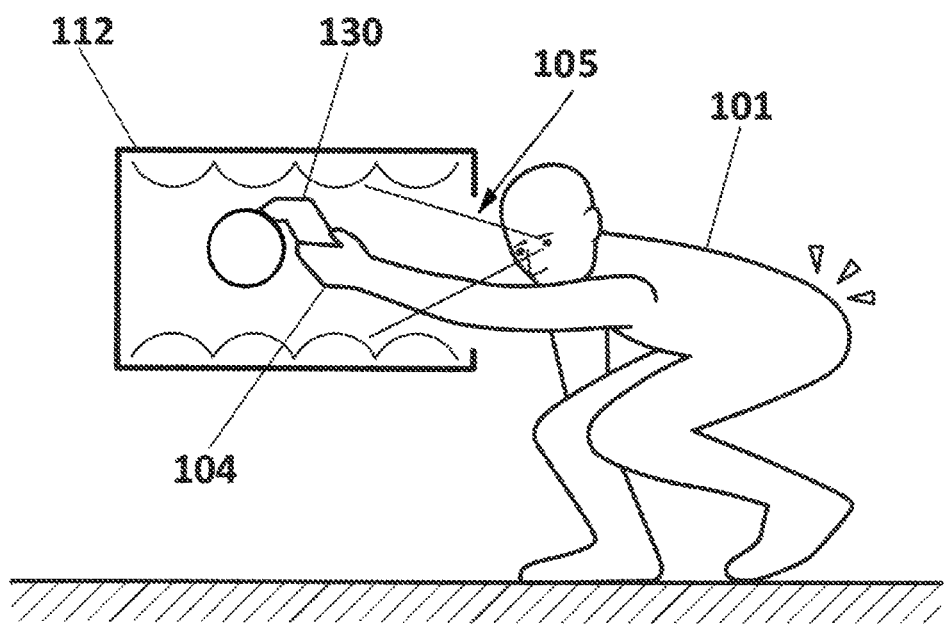
FIG. 1A shows a first example of a conventional installation procedure in a target area of an aircraft.

FIG. 1A shows a first example of a conventional installation procedure performed by an operator (101) in a target area (112) of an aircraft which has a difficult access for the operator. FIG. 1A shows an operator (101) holding a tool or installation tool (130) with his bare hand (104) trying to access a working target area (112) of the aircraft having a difficult access through an access hole (105). In this example, in order to obtain direct sight to the working area in order to perform the installation task, the operator (101) must bend and achieve an uncomfortable and unstable body position that may cause long term injuries and affect the final overall result of the installation.

Figure 1B:
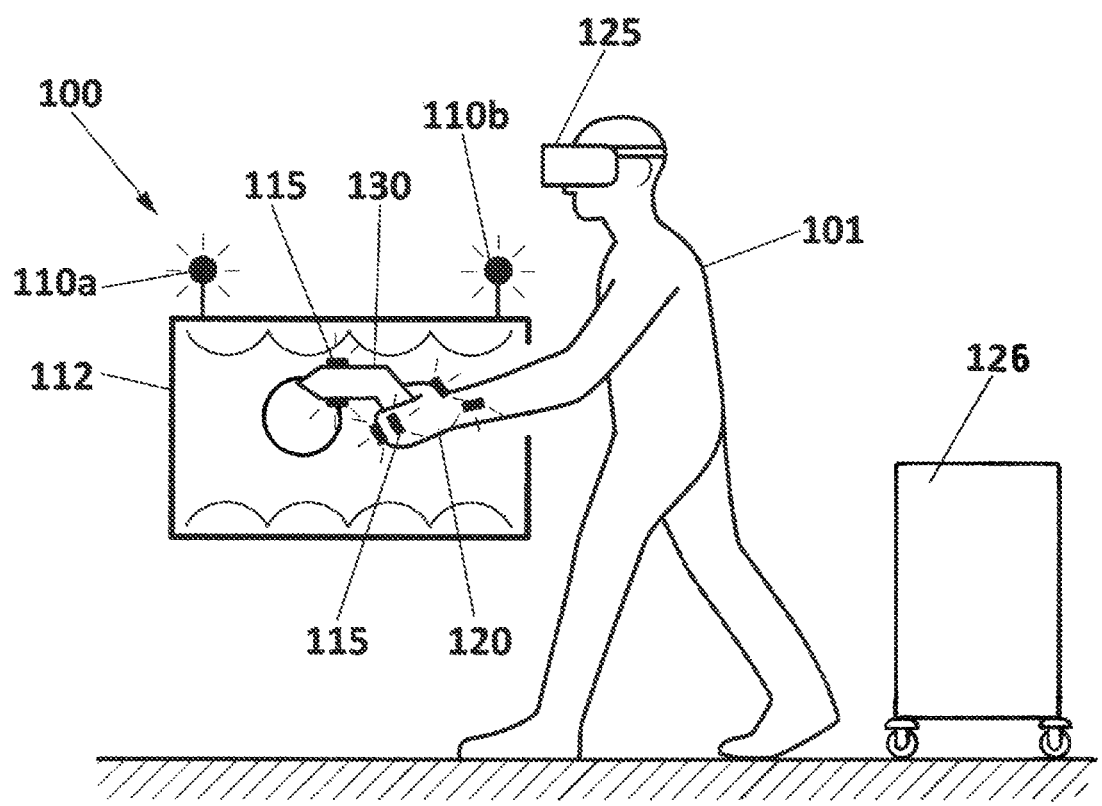
FIG. 1B shows an example of a VR system a according to the present disclosure used in the first example of conventional installation procedure.

FIG. 1B shows an example of a VR system (100) for providing a VR visualization of the target area (112) of an aircraft used in the first example of conventional installation procedure of FIG. 1A. The target area (112) of the aircraft can be a working area having a difficult access and wherein an installation must be performed by an operator as, e.g., an assembly fitter operator. The system (100) comprises two reference targets (110a) and (110b) which can be established in known locations of this target area (112) of the aircraft. In particular, the example VR system (100) comprises two reference targets (110a) and (110b) located on an upper part of the working area as it is shown in FIG. 1B. Furthermore, the system (100) also comprises hand gloves (120) configured to fit the operator's hands.

Furthermore, the system (100) comprises a plurality of sensing elements (115) established on the operator's hand glove (120) and on an operator's installation tool (130). The sensing elements (115) provide information about the operator's hands and operator's installation tool (130) location. Hence, the system (100) can capture the position and attitude of the hand of the operator within the glove (120) and the operator's tool (130) in relation with fixed reference targets (110a) and (110b) in the area of the aircraft.

The VR system (100) comprises a reception device (126) as, e.g., a portable processor that receives the information provided by the sensing elements (115) to provide relative locations of the sensing elements against the fixed reference targets (110a) and (110b) established in the aforementioned locations. The reception device (126) comprises a processor that builds the VR visualization that visualizes the operator's hands and operator's installation tool (130) against the area of the aircraft based on the relative locations of the sensing elements (115). Furthermore, the VR system (100) comprises output means as display means that represents the VR visualization to the operator (101). In particular, the VR visualization can be displayed by display means (125) as, e.g., VR glasses. In some examples, the display means (125) comprises a stereo display monitor. In other examples, the display means (125) also comprises audio means for aural representation and haptic means for contact or force representation. In this example, the operator does not need to bend as shown in FIG. 1A, and hence, injuries are minimized and poor operator postures avoided.

Figure 2A:
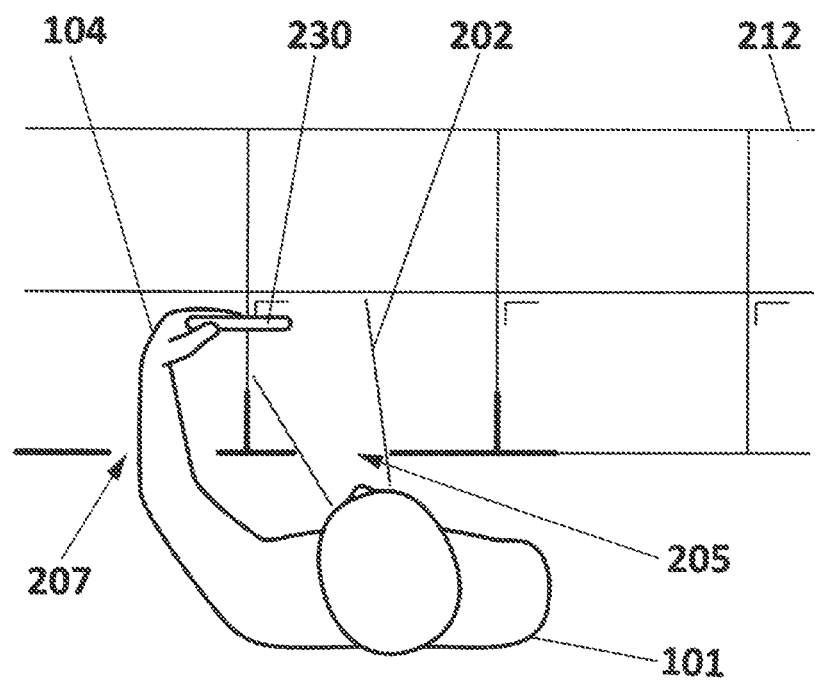
FIG. 2A shows a second example of conventional installation procedure in a target area of an aircraft.

Once the VR visualization is set up, the operator requires no direct sight of the target area and can rely on the VR visualization to perform an installation, e.g., to locate and install an element, enhancing the ergonomics of the assembly. This advantage is explained in more detail in the following figures:

FIG. 2A shows a second example of a conventional situation wherein the operator (101) has to perform an installation operation in another target area (212) of an aircraft. The operator (101) access the target area (212) through an accessing hole (207). The operator (101) holds another installation tool (203) with his bare hand (104). In order to perform this installation task, due to the difficult access of the target area (212) of the aircraft, a direct sight view hole (205) that permits the operator to have direct sight must be performed in the structure of the target area (212). As previously mentioned, this direct sight criteria affects the areas where certain elements can be installed but in all the cases, the sizes of holes causes an increase of weight for the structure, i.e., reinforcements around the holes or simply due to the change in load path. It can be seen by direct paths (202) the direct sight required by the operator (101) in order to be able to use the installation tool (203) for performing a particular installation.

Figure 2B:
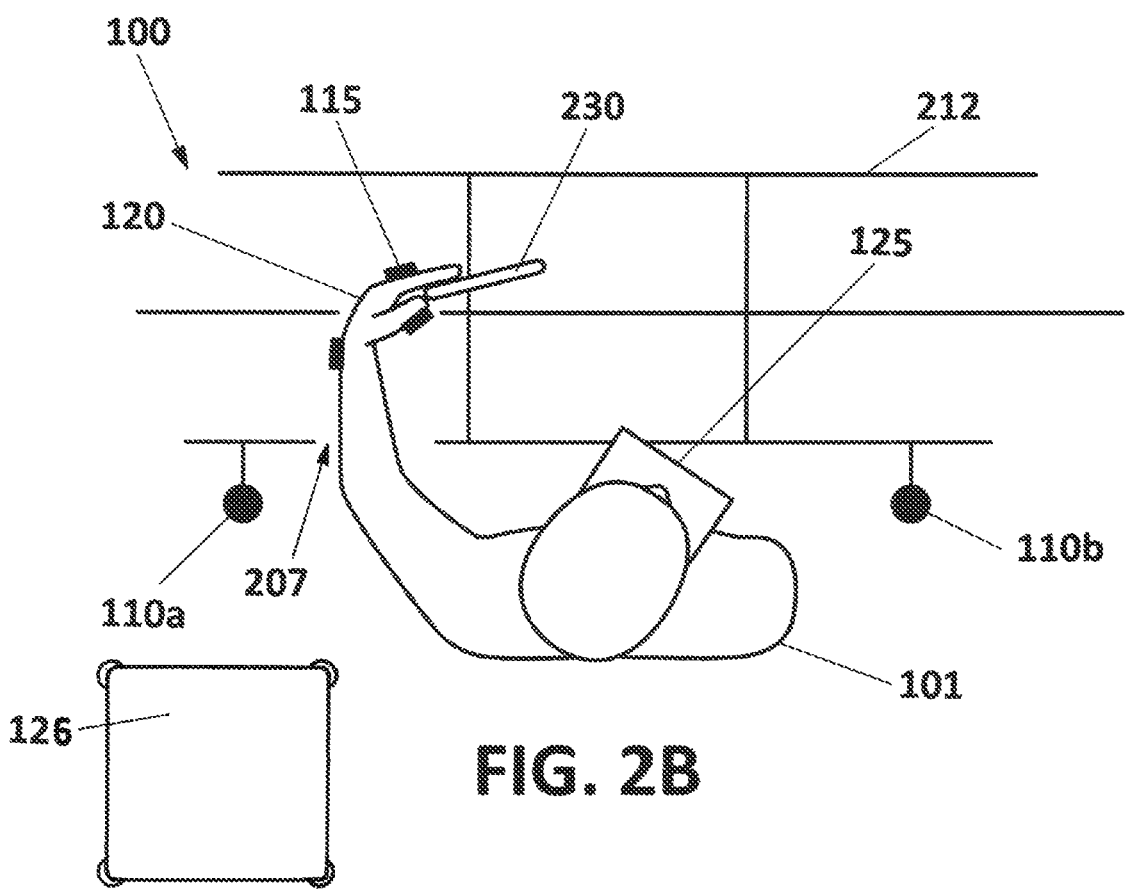
FIG. 2B shows an example of a VR system a according to the present disclosure used in the second example of conventional installation procedure.

FIG. 2B shows one of the main advantages achieved by an example of a VR system (100) according to the present disclosure used in the second example of installation procedure of FIG. 2A, i.e., no direct sight criteria is needed. FIG. 2B shows the VR system (100) comprising the two reference targets (110a) and (110b) established in known locations in the target area (112) of an aircraft and hand gloves (120) configured to fit the operator's hands holding a tool (230). The sensing elements (115) are established on the hand glove (120) of the operator 101. The sensing elements (115) provide information about the operator's hands location. The reception device (126) receives the information provided by the sensing elements (115) to provide relative locations of these sensing elements (215) against the two reference targets (110a) and (110b) established in two known locations on surface of the target area (112) of the aircraft. Again, the VR system (100) can capture the position and attitude of the hand of the operator (101) within the glove (120) and a tool (230) in relation with the fixed reference targets (110a) and (110b) in the target area (212) of the aircraft. The operator (101) access the target area (212) through an accessing hole (207). In contrast to FIG. 2A, it can be appreciated that the target area (112) lacks now the direct sight view hole (205) which is no longer needed due to the VR system (100). As previously mentioned, performing holes (as, e.g., direct sight view hole (205)) in the structure of the aircraft can cause an increase of weight in the structure.

This drawback is eliminated with the proposed VR system (100).

The reception device (126) further comprises processing means adapted to build the VR visualization that visualizes the operator's hands against the area of the aircraft based on the relative locations of the sensing elements (115) and the reference targets (110a) and (110b). The VR system (100) comprises display means (125) as, e.g., VR glasses adapted to represent the VR visualization to the operator (101). In some other examples, the VR glasses could comprise audio means and/or haptic means. Hence, the operator requires no direct sight of the target area (212) and can rely on the VR visualization to perform an installation.

Even though reference has been made to a specific embodiment of the invention, it is obvious for a person skilled in the art that the VR system described herein is susceptible to numerous variations and modifications, and that all the details mentioned can be substituted for other technically equivalent ones without departing from the scope of protection defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A virtual reality (VR) system for providing a real time VR visualization of a target area of an aircraft, the system comprising:
   one or more reference targets established in known locations in the target area of an aircraft, wherein the one or more reference targets comprise target points located by means of holes;
   hand gloves;
   a plurality of sensing elements established on at least operator hand gloves,
   wherein the sensing elements provide information about a location of an operator's hands,
   a reception device adapted to receive the information provided by the sensing elements to provide relative locations of the sensing elements against the one or more reference targets established in said known locations, the reception device comprising:
   processing means configured to build the real time VR visualization that represents at least the operator's hands against the target area of the aircraft based on the relative locations of the sensing elements; and
   display means configured to display the real time VR visualization to the operator.

2. The system according to claim 1, further comprising operator's tools and fixtures instrumented including electrical tools, pneumatic tools, liquid-fuel tools and hydraulic tools, wherein the plurality of sensing elements are also established in the operator's tools and the fixtures instrumented.

3. The system according to claim 2, wherein the processing means are further adapted to visualize the operator's tools and fixtures instrumented in the VR visualization.

4. The system according to claim 1, wherein the display means comprises a stereo display monitor.

5. The system according to claim 1 wherein the reception device is combined with the display means which comprises a pair of VR glasses.

6. The system according to claim 1, wherein the processing means is further adapted to build the real time VR visualization from information of a location and attitude of each finger and an overall location and orientation of each operator's hand.

7. A method for providing a real time virtual reality (VR) visualization, the method comprising:
   establishing one or more reference targets in known locations of a target area of an aircraft;
   locating the one or more reference targets by preforming holes;
   providing hand gloves configured to fit hands of an operator;
   establishing a plurality of sensing elements on at least the operator's hand gloves, wherein the sensing elements provide information about a location of the operator's hands;
   receiving at a reception device the information provided by the sensing elements to provide relative locations of the sensing elements against the one or more reference targets established in said known locations;
   building, by a processor, the VR visualization that represents at least the operator's hands against the known locations of the aircraft based on the relative locations of the sensing elements; and
   displaying, with display means, the VR visualization to the operator.

8. The method according to claim 7, further comprising: establishing one or more reference targets in an operator's working area.

* * * * *